US012452952B2

United States Patent
Yu et al.

(10) Patent No.: US 12,452,952 B2
(45) Date of Patent: Oct. 21, 2025

(54) COMMUNICATION METHOD AND APPARATUS

(71) Applicant: HUAWEI TECHNOLOGIES CO., LTD., Guangdong (CN)

(72) Inventors: Haifeng Yu, Beijing (CN); Bingzhao Li, Beijing (CN); Zhenzhen Cao, Boulogne Billancourt (FR)

(73) Assignee: Huawei Technologies Co., Ltd., Shenzhen (CN)

( * ) Notice: Subject to any disclaimer, the term of this patent is extended or adjusted under 35 U.S.C. 154(b) by 368 days.

(21) Appl. No.: 18/304,809

(22) Filed: Apr. 21, 2023

(65) Prior Publication Data

US 2023/0262836 A1    Aug. 17, 2023

Related U.S. Application Data

(63) Continuation of application No. PCT/CN2020/122816, filed on Oct. 22, 2020.

(51) Int. Cl.
*H04W 76/28* (2018.01)
*H04L 1/1812* (2023.01)
(Continued)

(52) U.S. Cl.
CPC .......... *H04W 76/28* (2018.02); *H04L 1/1812* (2013.01); *H04W 72/1263* (2013.01); *H04W 72/231* (2023.01)

(58) Field of Classification Search
None
See application file for complete search history.

(56) References Cited

U.S. PATENT DOCUMENTS

2017/0201964 A1    7/2017    Gupta et al.
2018/0206289 A1    7/2018    Kim et al.

FOREIGN PATENT DOCUMENTS

CN    108307507 A    7/2018
CN    111050423 A    4/2020
(Continued)

OTHER PUBLICATIONS

Huawei et al., "Discussion on multicast support for Idle/Inactive UEs," 3GPP TSG RAN WG1 #103-e, R1-2007564, E-meeting, Oct. 26-Nov. 13, 2020, 3 pages.
(Continued)

*Primary Examiner* — Walter J Divito
(74) *Attorney, Agent, or Firm* — Fish & Richardson P.C.

(57) ABSTRACT

The present invention discloses a communication method and an apparatus. One example method includes: sending feedback information to a network device, where downlink control information (DCI) for scheduling the first data packet is scrambled by group radio network temporary identifier (G-RNTI); receiving a second information, where the second information comprises a discontinuous reception (DRX) configuration information corresponding to a first unicast service, the DRX configuration information corresponding to the first unicast service comprises duration of a second downlink HARQ RTT timer and duration of a second downlink DRX retransmission timer; starting the second downlink HARQ RTT timer at a first moment after an end of sending the feedback information; monitoring, based on DRX configuration information, a Physical Downlink Control Channel (PDCCH) for scheduling information of a data packet of the first multicast service, where the scheduling information is scrambled by the C-RNTI.

20 Claims, 8 Drawing Sheets

(51) Int. Cl.
*H04W 72/1263* (2023.01)
*H04W 72/231* (2023.01)

(56) References Cited

FOREIGN PATENT DOCUMENTS

| CN | 111800893 A | 10/2020 |
| EP | 2521415 B1 | 3/2015 |
| EP | 2469939 B1 | 9/2018 |
| EP | 3379894 B1 | 4/2020 |
| RU | 2689405 C1 | 5/2019 |
| WO | 2016163548 A1 | 10/2016 |
| WO | 2019101146 A1 | 5/2019 |
| WO | 2020056068 A1 | 3/2020 |

OTHER PUBLICATIONS

Office Action in Japanese Appln. No. 2023-524569, mailed on May 21, 2024, 5 pages (with English translation).
3GPP TS 38.331 V16.1.0, "3rd Generation Partnership Project; Technical Specification Group Radio Access Network; NR; Radio Resource Control (RRC) protocol specification (Release 16)," Jul. 2020, 911 pages.
International Search Report and Written Opinion in International Appln. No. PCT/CN2020/122816, mailed on Jul. 15, 2021, 17 pages (with English translation).
Office Action in Russian Appln. No. 2023112824/07, mailed on Oct. 17, 2023, 12 pages (with English machine translation).
Office Action in Indian Appln. No. 202337030320, mailed on Apr. 1, 2024, 5 pages (with English translation).
3GPP TS 38.300 V16.3.0, "3rd Generation Partnership Project; Technical Specification Group Radio Access Network; NR; NR and NG-RAN Overall Description; Stage 2 (Release 16)," Sep. 2020, 148 pages.
3GPP TS 38.331 V16.2.0, "3rd Generation Partnership Project; Technical Specification Group Radio Access Network; NR; Radio Resource Control (RRC) protocol specification (Release 16)," Sep. 2020, 921 pages.
RAN1, "LS on RAN1 clarification on MWUS frequency allocation," 3GPP TSG RAN WG2#111-e, R2-2006506, Online meeting, Aug. 17-28, 2020, 2 pages.
Ericsson, "Overview of NR MBS work item," 3GPP TSG-RAN WG2 #111e, R2-2007639, Electronic meeting, Aug. 17-28, 2020, 4 pages.
Alcatel-Lucent et al., "Discussion on functionalities required for support of SC-PTM," 3GPP TSG RAN WG2 Meeting #89bis, R2-151446, Bratislava, Slovakia, Apr. 20-24, 2015, 4 pages.
3GPP TS 38.321 V16.2.1, "3rd Generation Partnership Project; Technical Specification Group Radio Access Network; NR; Medium Access Control (MAC) protocol specification (Release 16)," Sep. 2020, 154 pages.

COMMUNICATION METHOD AND APPARATUS

CROSS-REFERENCE TO RELATED APPLICATIONS

This application is a continuation of International Application No. PCT/CN2020/122816, filed on Oct. 22, 2020, the disclosure of which is hereby incorporated by reference in its entirety.

TECHNICAL FIELD

The present invention relates to the field of communication technologies, and in particular, to a communication method and an apparatus.

BACKGROUND

Potential application scenarios of a multicast service include V2X (vehicle-to-everything, vehicle-to-everything), the internet of things (internet of things, IoT), and the like. In an existing multicast service solution for the foregoing scenarios, a network device usually sends only scheduling information to a terminal device. Reliability of a multicast service is usually low. If the existing multicast service solution is still used in a 5G or future communication system, reliability of the multicast service is low, and a service requirement cannot be met. In an existing solution, a manner of introducing a multicast hybrid automatic repeat request HARQ feedback is provided to improve reliability of a multicast service. However, after the multicast HARQ feedback is introduced, implementation of some receiving mechanisms and the like in a conventional technology is affected, which is a problem that needs to be urgently resolved.

SUMMARY

Embodiments of the present invention provide a communication method and a related apparatus, to improve reliability of a multicast service.

According to a first aspect, an embodiment of this application provides a communication method. The method is applicable to a terminal device, and includes:
  sending feedback information to a network device, where the feedback information corresponds to a first multicast service;
  determining discontinuous reception DRX configuration information, where the DRX configuration information includes at least one of discontinuous reception DRX configuration information corresponding to the first multicast service and DRX configuration information corresponding to a unicast service; and
  receiving scheduling information from the network device based on the DRX configuration information.

In this example, the terminal device sends the feedback information for the first multicast service to the network device, determines the discontinuous reception DRX configuration information, and receives the scheduling information from the network device based on the configuration information. In this case, the terminal device may send the feedback information corresponding to the multicast service to the network device, and receive the scheduling information from the network device based on the received configuration information. This avoids uncertainty about configuration information used by the terminal device to receive the scheduling information, and improves accuracy of receiving the scheduling information by the terminal device.

With reference to the first aspect, in a possible implementation, the DRX configuration information corresponding to the first multicast service includes duration of a first downlink hybrid automatic repeat request round trip time timer HARQ RTT timer and duration of a first downlink DRX retransmission timer.

With reference to the first aspect, in a possible implementation, the DRX configuration information corresponding to the unicast service includes duration of a second downlink hybrid automatic repeat request round trip time timer HARQ RTT timer and duration of a second downlink DRX retransmission timer.

With reference to the first aspect, in a possible implementation, the DRX configuration information includes the discontinuous reception DRX configuration information corresponding to the first multicast service and the DRX configuration information corresponding to the unicast service, and the receiving scheduling information from the network device based on the DRX configuration information includes:
  starting the first HARQ RTT timer; if the first HARQ RTT timer expires, starting the first downlink DRX retransmission timer; and during running of the first downlink DRX retransmission timer, monitoring a PDCCH by using a first radio network temporary identifier RNTI corresponding to the first multicast service, and receiving scheduling information from the network device; and
  starting the second HARQ RTT timer; if the second HARQ RTT timer expires, starting the second downlink DRX retransmission timer; and during running of the second downlink DRX retransmission timer, monitoring a PDCCH by using a second RNTI corresponding to the unicast service, and receiving scheduling information from the network device.

In this example, the first HARQ RTT timer is started, and the first HARQ RTT timer is started. In this case, the PDCCH may be monitored and the scheduling information from the network device may be received by using the first radio network temporary identifier RNTI corresponding to the first multicast service, and the PDCCH may be monitored and the scheduling information from the network device may be received by using the second RNTI corresponding to the unicast service. This avoids uncertainty about configuration information used by the terminal device to receive the scheduling information, and improves accuracy of receiving the scheduling information by the terminal device.

With reference to the first aspect, in a possible implementation, the DRX configuration information includes the discontinuous reception DRX configuration information corresponding to the first multicast service, and the receiving scheduling information from the network device based on the DRX configuration information includes:
  starting the first HARQ RTT timer; if the first HARQ RTT timer expires, starting the first downlink DRX retransmission timer; and during running of the first retransmission timer, monitoring a PDCCH by using a first RNTI and a second RNTI, and receiving the scheduling information from the network device.

In this example, the DRX configuration information includes the discontinuous reception DRX configuration information corresponding to the first multicast service. During running of the first retransmission timer, the terminal device monitors the PDCCH by using the first RNTI and the second RNTI, and receives the scheduling information from the network device. This avoids uncertainty about configuration information used by the terminal device to receive the scheduling information, and improves accuracy of receiving the scheduling information by the terminal device.

With reference to the first aspect, in a possible implementation, the DRX configuration information includes the DRX configuration information corresponding to the unicast service, and the receiving scheduling information from the network device based on the DRX configuration information includes:

starting the second HARQ RTT timer; if the second HARQ RTT timer expires, starting the second downlink DRX retransmission timer; and during running of the second retransmission timer, monitoring a PDCCH by using a first RNTI and a second RNTI, and receiving the scheduling information from the network device.

In this example, the DRX configuration information includes the DRX configuration information corresponding to the unicast service. During running of the second retransmission timer, the terminal device monitors the PDCCH by using the first RNTI and the second RNTI, and receives the scheduling information from the network device, to receive retransmission information sent by the network device. This avoids uncertainty about configuration information used by the terminal device to receive the scheduling information, and improves accuracy of receiving the scheduling information by the terminal device.

With reference to the first aspect, in a possible implementation, the starting the first HARQ RTT timer and/or starting the second HARQ RTT timer includes:

starting the first HARQ RTT timer at a first moment after an end of sending the feedback information to the network device; and/or starting the second HARQ RTT timer at a second moment after an end of sending the feedback information to the network device.

With reference to the first aspect, in a possible implementation, the method further includes:

starting the first downlink DRX retransmission timer at a third moment after the first HARQ RTT timer expires; and/or starting the first downlink DRX retransmission timer at a fourth moment after the second HARQ RTT timer expires.

With reference to the first aspect, in a possible implementation, the first moment is an $a^{th}$ symbol, the second moment is a $b^{th}$ symbol, the third moment is a $c^{th}$ symbol, and the fourth moment is a $d^{th}$ symbol, where a, b, c, and d are positive integers greater than or equal to 1.

With reference to the first aspect, in a possible implementation, the method further includes:

starting the first HARQ RTT timer if the feedback information indicates that multicast service data is unsuccessfully received; or starting the second HARQ RTT timer if the feedback information indicates that multicast service data is unsuccessfully received.

With reference to the first aspect, in a possible implementation, the method further includes:

obtaining first indication information, where the first indication information indicates that the network device supports retransmission of the multicast service in a unicast manner.

In this example, the first indication information indicates that the network device supports retransmission of the multicast service in the unicast manner, so that the terminal device may be notified in advance of a retransmission manner that may be used by the network device. In this way, when the terminal device does not learn that the network device supports retransmission of the multicast service in the unicast manner, the terminal device does not miss retransmission scheduling signaling and/or retransmission scheduling data sent by the network device to the terminal device.

With reference to the first aspect, in a possible implementation, the first indication information is carried in any one of the following: a system message, a radio resource control RRC message, a media access control control element MAC CE, or downlink control information DCI.

With reference to the first aspect, in a possible implementation, the determining discontinuous reception DRX configuration information includes:

receiving second indication information, where the second indication information indicates the terminal device to use the DRX configuration information corresponding to the unicast service and/or the DRX configuration information corresponding to the multicast service; and determining the discontinuous reception DRX configuration information based on the second indication information.

In this example, the network device may control the configuration information more flexibly based on the second indication information, to provide control flexibility, and ensure that the terminal device and the network device align understanding of used DRX configuration information. In addition, when the terminal device and the network device align understanding, energy consumption of the terminal device caused by unnecessary PDCCH monitoring can be avoided, or missing of a scheduling command and/or data sent by the network device can be avoided.

With reference to the first aspect, in a possible implementation, the scheduling information of the network device includes scheduling information for retransmission of the first multicast service and/or scheduling information for transmission of a new data packet, where the new data packet includes a data packet of a second multicast service or a data packet corresponding to the unicast service.

According to a second aspect, an embodiment of this application provides a communication method. The method is applicable to a network device, and includes:

receiving feedback information sent by a terminal device, where the feedback information corresponds to a first multicast service; and sending scheduling information to the terminal device based on the feedback information.

With reference to the second aspect, in a possible implementation, the method further includes:

sending first indication information, where the first indication information indicates that the network device supports retransmission of the multicast service in a unicast manner.

With reference to the second aspect, in a possible implementation, the first indication information is carried in any one of the following: a system message, a radio resource control RRC message, a media access control control element MAC CE, or downlink control information DCI.

With reference to the second aspect, in a possible implementation, the method further includes:

sending second indication information, where the second indication information indicates the terminal device to use DRX configuration information corresponding to a unicast service and/or DRX configuration information corresponding to the multicast service.

With reference to the second aspect, in a possible implementation, the DRX configuration information corresponding to the first multicast service includes duration of a first downlink hybrid automatic repeat request round trip time timer HARQ RTT timer and duration of a first downlink DRX retransmission timer.

With reference to the second aspect, in a possible implementation, the DRX configuration information corresponding to the unicast service includes duration of a second downlink hybrid automatic repeat request round trip time timer HARQ RTT timer and duration of a second downlink DRX retransmission timer.

With reference to the second aspect, in a possible implementation, the scheduling information includes scheduling information for retransmission of the first multicast service and/or scheduling information for transmission of a new data packet, where
    the new data packet includes a data packet of a second multicast service or a data packet corresponding to the unicast service.

According to a third aspect, an embodiment of this application provides a terminal device, including:
    a sending unit, configured to send feedback information to a network device, where the feedback information corresponds to a first multicast service;
    a determining unit, configured to determine discontinuous reception DRX configuration information, where the DRX configuration information includes at least one of discontinuous reception DRX configuration information corresponding to the first multicast service and DRX configuration information corresponding to a unicast service; and
    a receiving unit, configured to receive scheduling information from the network device based on the DRX configuration information.

With reference to the third aspect, in a possible implementation, the DRX configuration information corresponding to the first multicast service includes duration of a first downlink hybrid automatic repeat request round trip time timer HARQ RTT timer and duration of a first downlink DRX retransmission timer.

With reference to the third aspect, in a possible implementation, the DRX configuration information corresponding to the unicast service includes duration of a second downlink hybrid automatic repeat request round trip time timer HARQ RTT timer and duration of a second downlink DRX retransmission timer.

With reference to the third aspect, in a possible implementation, the DRX configuration information includes the discontinuous reception DRX configuration information corresponding to the first multicast service and the DRX configuration information corresponding to the unicast service, and the receiving unit is configured to:
    start the first HARQ RTT timer; if the first HARQ RTT timer expires, start the first downlink DRX retransmission timer; and during running of the first downlink DRX retransmission timer, monitor a PDCCH by using a first radio network temporary identifier RNTI corresponding to the first multicast service, and receive scheduling information from the network device; and
    start the second HARQ RTT timer; if the second HARQ RTT timer expires, start the second downlink DRX retransmission timer; and during running of the second downlink DRX retransmission timer, monitor a PDCCH by using a second RNTI corresponding to the unicast service, and receive scheduling information from the network device.

With reference to the third aspect, in a possible implementation, the DRX configuration information includes the discontinuous reception DRX configuration information corresponding to the first multicast service, and the receiving unit is configured to:
    start the first HARQ RTT timer; if the first HARQ RTT timer expires, start the first downlink DRX retransmission timer; and during running of the first retransmission timer, monitor a PDCCH by using a first RNTI and a second RNTI, and receive the scheduling information from the network device.

With reference to the third aspect, in a possible implementation, the DRX configuration information includes the DRX configuration information corresponding to the unicast service, and the receiving unit is configured to:
    start the second HARQ RTT timer; if the second HARQ RTT timer expires, start the second downlink DRX retransmission timer; and during running of the second retransmission timer, monitor a PDCCH by using a first RNTI and a second RNTI, and receive the scheduling information from the network device.

With reference to the third aspect, in a possible implementation, in case of starting the first HARQ RTT timer and/or starting the second HARQ RTT timer, the receiving unit is specifically configured to:
    start the first HARQ RTT timer at a first moment after an end of sending the feedback information to the network device; and/or
    start the second HARQ RTT timer at a second moment after an end of sending the feedback information to the network.

With reference to the third aspect, in a possible implementation, the receiving unit is further configured to:
    start the first downlink DRX retransmission timer at a third moment after the first HARQ RTT timer expires; and/or
    start the first downlink DRX retransmission timer at a fourth moment after the second HARQ RTT timer expires.

With reference to the third aspect, in a possible implementation, the first moment is an $a^{th}$ symbol, the second moment is a $b^{th}$ symbol, the third moment is a $c^{th}$ symbol, and the fourth moment is a $d^{th}$ symbol, where a, b, c, and d are positive integers greater than or equal to 1.

With reference to the third aspect, in a possible implementation, the receiving unit is further configured to:
    start the first HARQ RTT timer if the feedback information indicates that multicast service data is unsuccessfully received; or
    start the second HARQ RTT timer if the feedback information indicates that multicast service data is unsuccessfully received.

With reference to the third aspect, in a possible implementation, the device is further configured to:
    obtain first indication information, where the first indication information indicates that the network device supports retransmission of the multicast service in a unicast manner.

With reference to the third aspect, in a possible implementation, the first indication information is carried in any one of the following: a system message, a radio resource control RRC message, a media access control control element MAC CE, or downlink control information DCI.

With reference to the third aspect, in a possible implementation, the determining unit is configured to:

receive second indication information, where the second indication information indicates the terminal device to use the DRX configuration information corresponding to the unicast service and/or the DRX configuration information corresponding to the multicast service; and determine the discontinuous reception DRX configuration information based on the second indication information.

With reference to the third aspect, in a possible implementation, the scheduling information of the network device includes scheduling information for retransmission of the first multicast service and/or scheduling information for transmission of a new data packet, where the new data packet includes a data packet of a second multicast service or a data packet corresponding to the unicast service.

According to a fourth aspect, an embodiment of this application provides a network device. The device includes:

a receiving unit, configured to receive feedback information sent by a terminal device, where the feedback information corresponds to a first multicast service; and a sending unit, configured to send scheduling information to the terminal device based on the feedback information.

With reference to the fourth aspect, in a possible implementation, the device is configured to:

send first indication information, where the first indication information indicates that the network device supports retransmission of the multicast service in a unicast manner.

With reference to the fourth aspect, in a possible implementation, the first indication information is carried in any one of the following: a system message, a radio resource control RRC message, a media access control control element MAC CE, or downlink control information DCI.

With reference to the fourth aspect, in a possible implementation, the device is further configured to:

send second indication information, where the second indication information indicates the terminal device to use DRX configuration information corresponding to a unicast service and/or DRX configuration information corresponding to the multicast service.

With reference to the fourth aspect, in a possible implementation, the DRX configuration information corresponding to the first multicast service includes duration of a first downlink hybrid automatic repeat request round trip time timer HARQ RTT timer and duration of a first downlink DRX retransmission timer.

With reference to the fourth aspect, in a possible implementation, the DRX configuration information corresponding to the unicast service includes duration of a second downlink hybrid automatic repeat request round trip time timer HARQ RTT timer and duration of a second downlink DRX retransmission timer.

With reference to the fourth aspect, in a possible implementation, the scheduling information includes scheduling information for retransmission of the first multicast service and/or scheduling information for transmission of a new data packet, where the new data packet includes a data packet of a second multicast service or a data packet corresponding to the unicast service.

According to a fifth aspect, an embodiment of this application provides a terminal device. The device includes:

a memory, configured to store instructions; and at least one processor, coupled to the memory.

When the at least one processor executes the instructions, the instructions enable the processor to perform the method according to the first aspect.

According to a sixth aspect, an embodiment of this application provides a network device. The device includes:

a memory, configured to store instructions; and at least one processor, coupled to the memory.

When the at least one processor executes the instructions, the instructions enable the processor to perform the method according to the second aspect.

According to a seventh aspect, an embodiment of the present invention provides a computer storage medium. The computer storage medium stores a computer program, and the computer program includes program instructions. When the program instructions are executed by a processor, the processor performs some or all methods in the first aspect or the second aspect.

These aspects or other aspects of the present invention are clearer and more comprehensible in descriptions of the following embodiments.

BRIEF DESCRIPTION OF DRAWINGS

To describe the technical solutions in embodiments of the present invention or in the prior art more clearly, the following briefly describes the accompanying drawings for describing embodiments or the prior art. It is clear that the accompanying drawings in the following description show merely some embodiments of the present invention, and a person of ordinary skill in the art may derive other drawings from these accompanying drawings without creative efforts.

DESCRIPTION OF EMBODIMENTS

The following describes embodiments of this application with reference to the accompanying drawings.

The following acronyms and abbreviations are used in embodiments of this application: C-RNTI (Cell RNTI, cell RNTI), G-RNTI (Group RNTI, group RNTI), AMF (Access and Mobility Management Function, access and mobility management function), UPF (User Plane Function, user plane function), gNB (gNB), ACK (Acknowledgment, acknowledgment)/NACK (Negative Acknowledge, negative acknowledgment), DRX, HARQ (Hybrid automatic repeat request, hybrid automatic repeat request), round-trip time RRT (Round-Trip Time), and PDCCH (Physical Downlink Control Channel, physical downlink control channel).

Figure 1A:
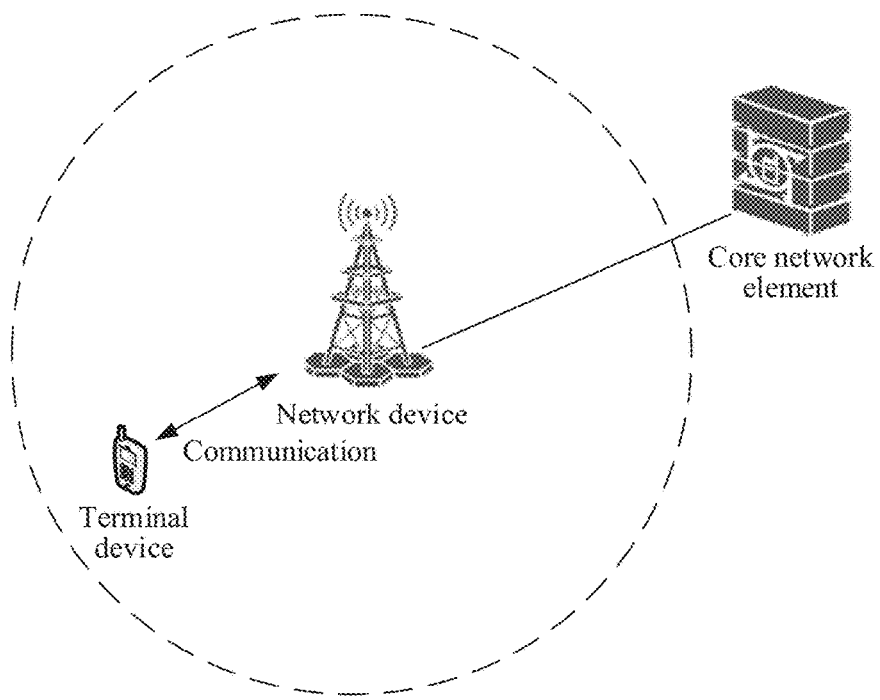
FIG. 1A is a schematic diagram of a communication system according to an embodiment of this application.

To better understand a communication method provided in embodiments of this application, the following first briefly describes a communication network to which the communication method is applied. As shown in FIG. 1A, the communication network includes a terminal device, a network device, and a core network element. The terminal device may exchange data with the network device, for example, exchange data of a multicast service or a unicast service. Specifically, for example, the terminal device receives scheduling information for a unicast service and scheduling information for a multicast service that are sent by the network device.

The terminal device in embodiments of this application includes a device that provides a user with voice and/or data connectivity, for example, a handheld device with a wireless connection function, or a processing device connected to a wireless modem. The terminal device may communicate with a core network through a radio access network (radio access network, RAN), and exchange a voice and/or data with the RAN. The terminal device may include user equipment (user equipment, UE), a wireless terminal device, a mobile terminal device, a device-to-device (device-to-device, D2D) communication terminal device, a vehicle-to-everything (vehicle-to-everything, V2X) terminal device, a machine-to-machine/machine type communications (machine-to-machine/machine-type communications, M2M/MTC) terminal device, an internet of things (internet of things, IoT) terminal device, a subscriber unit (subscriber unit), a subscriber station (subscriber station), a mobile station (mobile station), a remote station (remote station), an access point (access point, AP), a remote terminal (remote terminal), an access terminal (access terminal), a user terminal (user terminal), a user agent (user agent), a user device (user device), or the like. For example, the terminal device may include a mobile phone (or referred to as a "cellular" phone), a computer with a mobile terminal device, or a portable, pocket-sized, handheld, or computer built-in mobile apparatus. For example, it may be a device such as a personal communications service (personal communications service, PCS) phone, a cordless telephone set, a session initiation protocol (session initiation protocol, SIP) phone, a wireless local loop (wireless local loop, WLL) station, or a personal digital assistant (personal digital assistant, PDA). The terminal device may alternatively include a limited device, for example, a device with relatively low power consumption, a device with a limited storage capability, or a device with a limited computing capability. For example, the terminal device includes an information sensing device such as a barcode, radio frequency identification (radio frequency identification, RFID), a sensor, a global positioning system (global positioning system, GPS), or a laser scanner.

The network device includes, for example, an access network (access network, AN) device such as a base station (for example, an access point), and may be a device that communicates with a wireless terminal device over an air interface through one or more cells in an access network. Alternatively, for example, an access network device in a V2X technology is a road side unit (road side unit, RSU). The base station may be configured to mutually convert a received over-the-air frame and an internet protocol (IP) packet, and serve as a router between the terminal device and a remaining part of the access network. The remaining part of the access network may include an IP network. The RSU may be a fixed infrastructure entity supporting a V2X application, and may exchange a message with another entity supporting the V2X application. The access network device may further coordinate attribute management of the air interface. For example, the access network device may be an evolved NodeB (NodeB, eNB, or eNodeB, evolved NodeB) in a long term evolution (long term evolution, LTE) system or a long term evolution-advanced (long term evolution-advanced, LTE-A) system, a next generation NodeB (next generation NodeB, gNB) in a fifth generation mobile communication technology (the 5th generation, 5G) NR system, or a central unit (centralized unit, CU) and a distributed unit (distributed unit, DU) in a cloud radio access network (cloud radio access network, CloudRAN) system. This is not limited in embodiments of this application.

Certainly, the network device may further include a core network device. However, the technical solutions provided in embodiments of this application mainly relate to the access network device. Therefore, unless otherwise specified, a "network device" described below is an access network device.

Figure 1B:
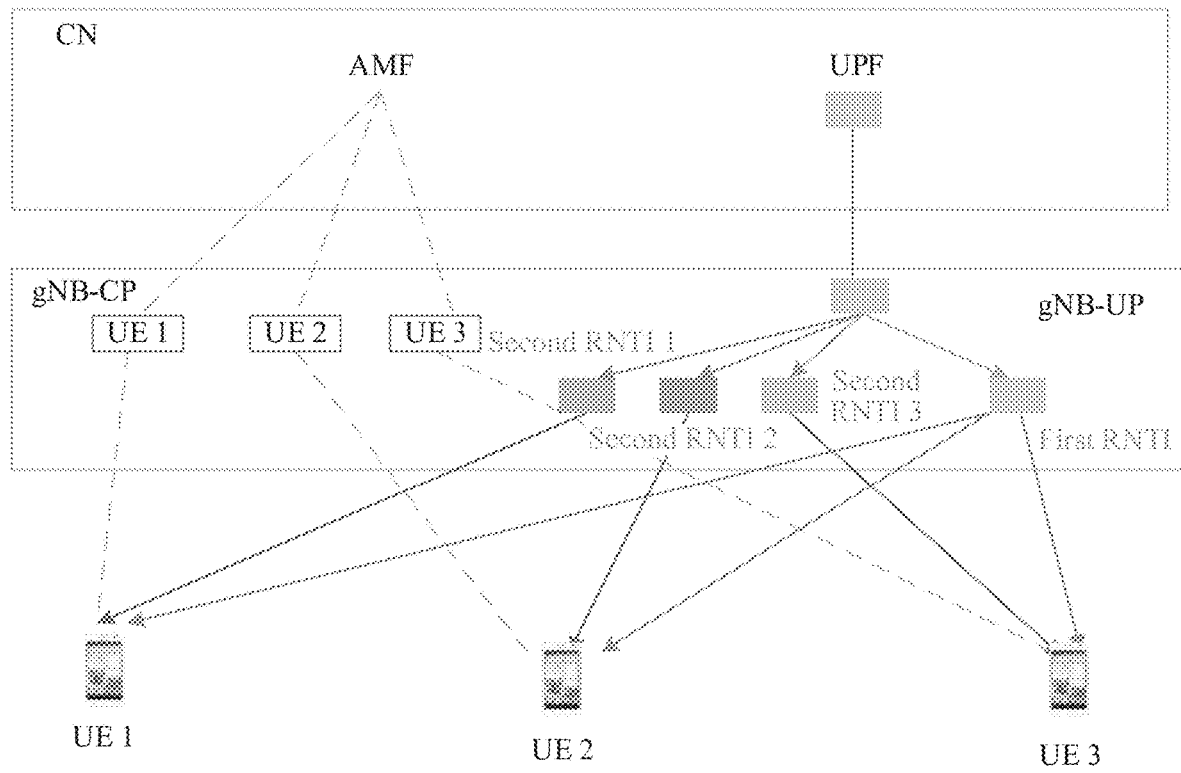
FIG. 1B is a schematic diagram of another communication system according to an embodiment of this application.

FIG. 1B is a schematic diagram of another communication system according to an embodiment of this application. As shown in FIG. 1B, the communication system includes an AMF (access and mobility management function), a UPF (user plane function), a base station, and user equipment (UE 1, UE 2, and UE 3). The AMF is configured to perform access management on the UE 1, the UE 2, and the UE 3, and the UPF performs functions such as routing on the UE 1, the UE 2, and the UE 3. The base station may be a gNB, or may be a base station in another mobile network, or the like. An example in which the base station is a gNB is used herein for description.

All the three terminal devices (the UE 1, the UE 2, and the UE 3) are connected to the gNB. In FIG. 1B, a dashed line shows a control plane connection, and a solid line shows a sending path of user data. The gNB configures a C-RNTI (a second RNTI) and a data radio bearer (data radio bearer, DRB) that is for a unicast bearer for each terminal device. The DRB is further associated with a G-RNTI (the second RNTI). The gNB implements dynamic conversion between unicast and multicast by using the G-RNTI and the C-RNTI. In the figure, the three terminal devices receive a same multicast service, and each terminal device has a unicast bearer, namely, a channel for receiving data based on the C-RNTI. The gNB further configures a same G-RNTI for the three terminal devices. When the C-RNTIs are for scheduling, the base station may separately schedule same data to the three terminal devices. In this case, unicast scheduling is performed. When the G-RNTI is for scheduling data, the base station schedules one piece of data, and all the three terminal devices can receive the data.

In embodiments of this application, the multicast service may be replaced with a multicast broadcast service.

Figure 2A:
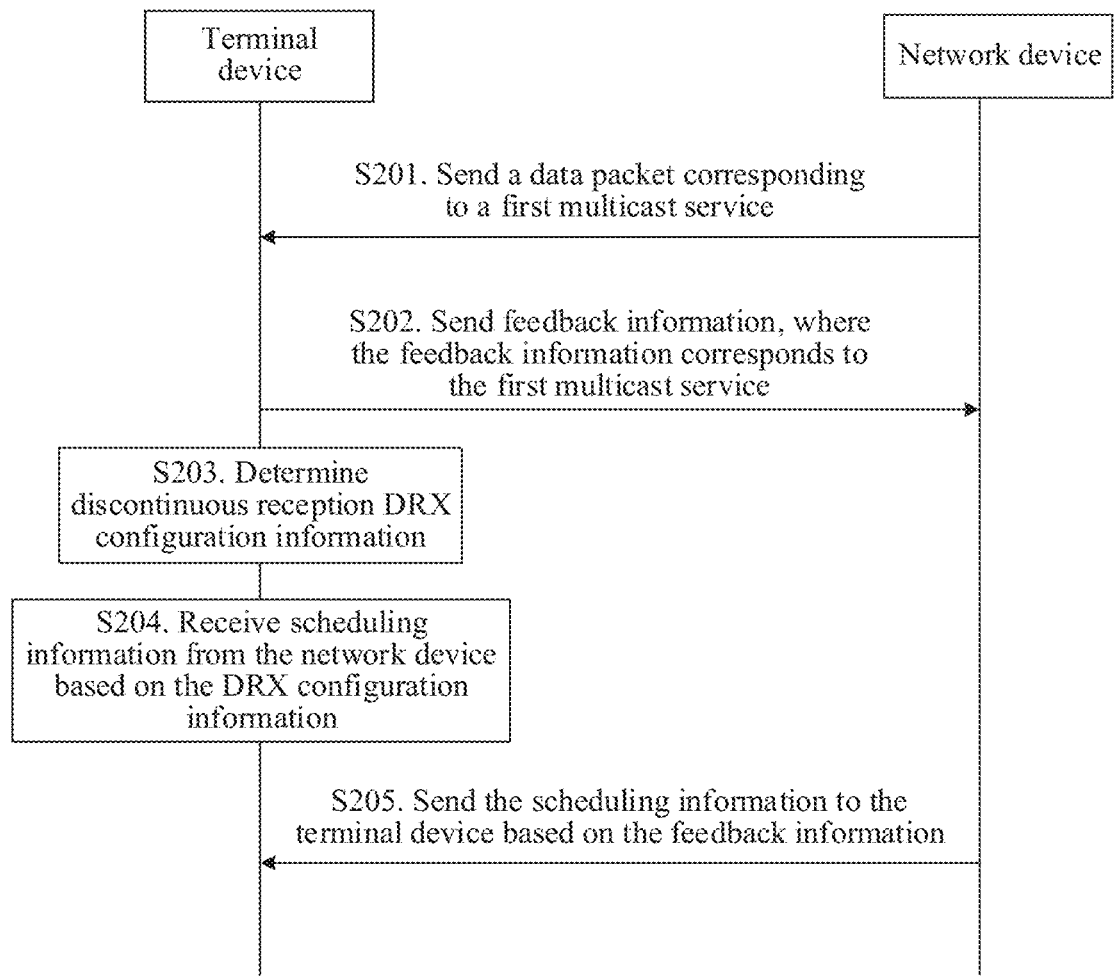
FIG. 2A is a schematic interaction diagram of a communication method according to an embodiment of this application.

FIG. 2A is a schematic interaction diagram of a communication method according to an embodiment of this application. As shown in FIG. 2A, the communication method includes the following steps.

S201. A network device sends a data packet corresponding to a first multicast service to a terminal device.

The network device may send the data packet corresponding to the first multicast service in a unicast or multicast scheduling manner.

Multicast is a technology in which a network device sends a data packet and the like to a plurality of UEs. In other words, the multicast technology is a technology in which a same service is simultaneously transmitted to a plurality of UEs by using shared data information. A group of UEs that receive a same service use a same downlink configuration for service reception, and the network device does not need to establish a corresponding communication link for each UE. Unicast means that a network device establishes a corresponding communication link for UE for service reception.

S202. The terminal device sends feedback information to the network device, where the feedback information corresponds to the first multicast service.

After receiving data that corresponds to the first multicast service and that is sent by the network device, the terminal device sends the feedback information to the network device.

The feedback information may include HARQ feedback information. The HARQ feedback information may be an ACK or a NACK, where the ACK indicates that the data packet corresponding to the first multicast service is successfully received, and the NACK indicates that the data packet corresponding to the first multicast service is unsuccessfully received.

Optionally, the feedback information may further include at least one of the following: channel state information CSI feedback information, a channel quality indicator CQI, precoding matrix indicator PMI information, and rank indicator RI information in an antenna matrix.

Optionally, the feedback information may be carried on a PUCCH or PUSCH resource.

Optionally, after receiving the data packet sent by the network device, the terminal device may determine a type of the data packet, for example, determine whether the data packet is a data packet corresponding to a multicast service or a data packet corresponding to a unicast service, and send the feedback information if the data packet is a data packet corresponding to a multicast service.

A method for determining that the data packet is a data packet of a multicast service includes:

Manner 1: The terminal device performs determining based on a first radio network temporary identifier RNTI corresponding to the first multicast service. For example, if the UE successfully descrambles DCI scrambled by using the first radio network temporary identifier RNTI, the UE may determine that multicast-related transmission (data or signaling) is received.

Manner 2: For multicast data sent in a unicast manner, a base station scrambles, by using a second radio network temporary identifier RNTI corresponding to a unicast service, DCI for scheduling the multicast data. In this case, after successfully descrambling the scheduling DCI scrambled by using the second radio network temporary identifier RNTI, the UE determines, based on a logical channel identifier (LCID, logical channel identifier) in a transport block TB (Transport Block) scheduled by using the DCI, whether the data packet is a data packet corresponding to a multicast service.

The first radio network temporary identifier RNTI may be a G-RNTI or an M-RNTI (multimedia broadcast multicast service RNTI, MBMS RNTI), and the second radio network temporary identifier RNTI may be a C-RNTI (cell RNTI, Cell RNTI), or the like.

S203. The terminal device determines discontinuous reception DRX configuration information, where the DRX configuration information includes at least one of discontinuous reception DRX configuration information corresponding to the first multicast service and DRX configuration information corresponding to a unicast service.

The DRX configuration information corresponding to the first multicast service includes duration of a first downlink hybrid automatic repeat request round trip time timer HARQ RTT timer and duration of a first downlink DRX retransmission timer.

The DRX configuration information corresponding to the unicast service includes duration of a second downlink hybrid automatic repeat request round trip time timer HARQ RTT timer and duration of a second downlink DRX retransmission timer.

Duration of the first HARQ RTT timer may be understood as duration in which the HARQ RTT timer performs timing. The duration of the first HARQ RTT timer, the duration of the second HARQ RTT timer, the duration of the first downlink DRX retransmission timer, and the duration of the second downlink DRX retransmission timer may be obtained from values preset by the terminal device, may be obtained from configuration information sent by the network device, or may certainly be obtained in another manner. This is not limited herein.

S204. The terminal device receives scheduling information from the network device based on the DRX configuration information.

The terminal device may receive the scheduling information from the network device based on a timing manner of the timer in the DRX configuration information.

The scheduling information may include scheduling information for retransmission of the first multicast service and/or scheduling information for transmission of a new data packet. The new data packet includes a data packet of a second multicast service or a data packet corresponding to the unicast service. The scheduling information for retransmission of the first multicast service includes information used by the network device to indicate the terminal device to retransmit the data packet of the first multicast service. The scheduling information includes at least one of the following: a time domain resource indication, a frequency domain resource indication, a modulation and coding scheme, new-data indication information (new transmission or retransmission may be determined based on the indication), a power control command indication, a redundancy version indication, a DCI format indication, carrier indication information, BWP indication information, a size of a physical resource block PRB (Physical Resource block) bundle, rate matching indicator (Rate matching indicator) information, a HARQ process number indication, PUCCH resource indication information, time sequence indication information between a PDSCH and a HARQ feedback, antenna port indication information, a transmission configuration indication (TCI, Transmission configuration indication), and a transmission manner indication (including unicast, multicast, or broadcast).

When the scheduling information is received, the scheduling information may be received by monitoring a PDCCH.

S205. The network device sends the scheduling information to the terminal device based on the feedback information.

The feedback information may include an ACK or a NACK, where the ACK indicates that the data packet corresponding to the first multicast service is successfully received, and the NACK indicates that the data packet corresponding to the first multicast service is unsuccessfully received. In this case, the network device may send, to the terminal device based on the ACK, information for scheduling transmission of the new data packet, and the network device may send, based on the NACK, the scheduling information for retransmission of the first multicast service to the terminal device.

In addition, the scheduling information includes the scheduling information for retransmission of the first multicast service and/or the scheduling information for transmission of the new data packet.

There is no sequence for performing step S204 and step S205. For example, the terminal device may continuously monitor the PDCCH, to receive the scheduling information from the network device. Alternatively, the terminal device may start a timer, and a moment at which the terminal device starts the timer may be earlier than a moment at which the network device sends the scheduling information.

If step S204 is performed before step S205, the scheduling information received by the terminal device may be different from the scheduling information sent by the network device to the terminal device. Specifically, the scheduling information in step S204 may be previous scheduling information, and the scheduling information in step 205 is current scheduling information. If step S204 is performed after step S205, the scheduling information received by the terminal device may be the same as the scheduling information sent by the network device to the terminal device.

Figure 2B:
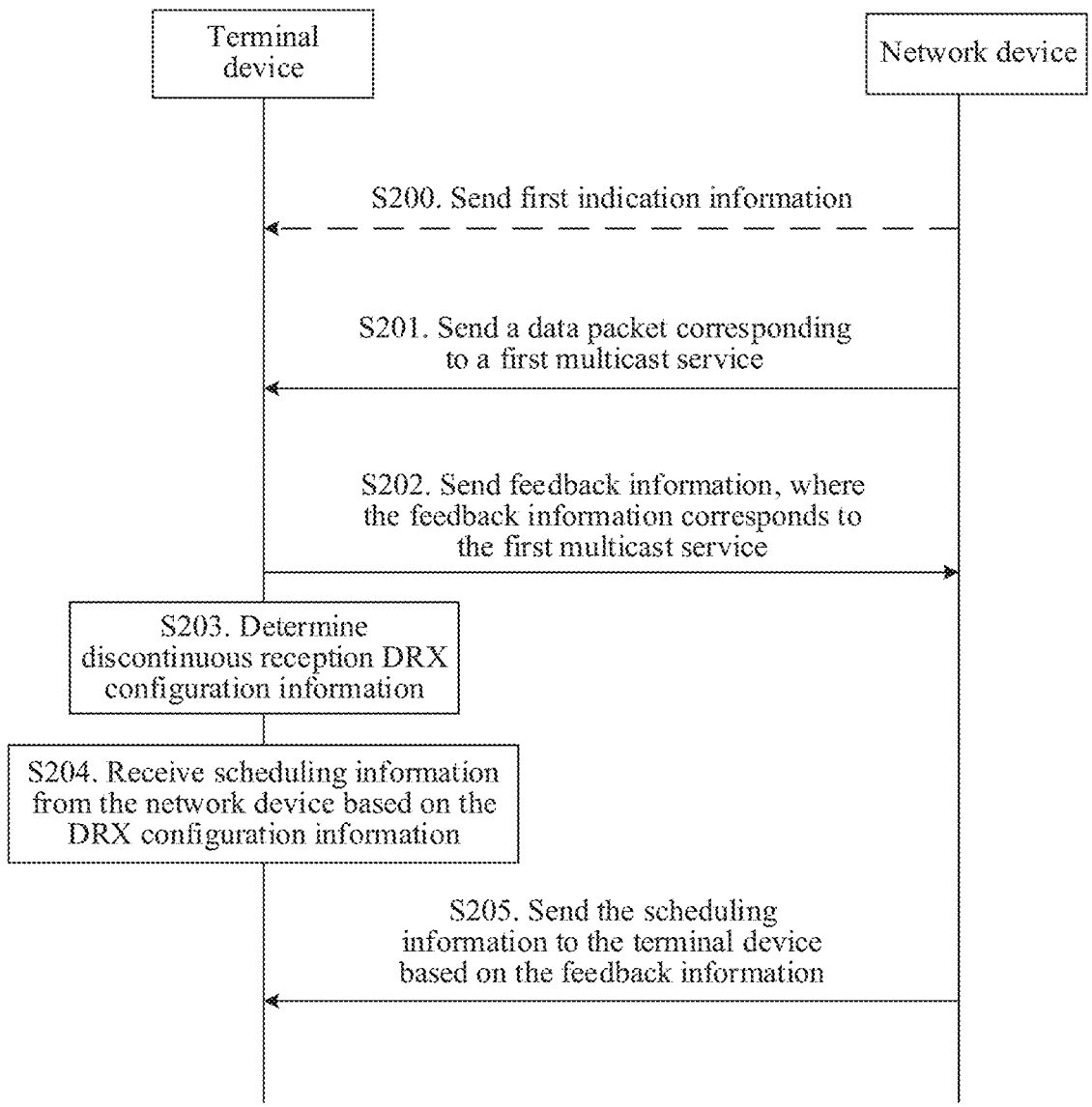
FIG. 2B is a schematic interaction diagram of another communication method according to an embodiment of this application.

The network device may further send first indication information to the terminal device, where the first indication information indicates that the network device supports retransmission of the multicast service in a unicast manner, or the first indication information indicates that the network device enables a function of retransmitting the multicast service in the unicast manner. As shown in step S200 in FIG. 2B, the step is represented by a dashed line, and it may be understood as that step S200 is an optional step. In other words, when the network device does not send the first indication information, the network device may still support or enable retransmission of the multicast service in the unicast manner. The retransmission in the unicast manner may be PTP retransmission.

In a possible implementation, a method for determining the discontinuous reception DRX configuration information by the terminal device includes: determining the discontinuous reception DRX configuration information in a preconfiguration manner, determining the discontinuous reception DRX configuration information by receiving indication information sent by the network device, or determining the discontinuous reception DRX configuration information by receiving indication information sent by the network device when the feedback information is a NACK, or the like.

The base station controls a multicast DRX function by configuring the following parameters. Each multicast service is configured to correspond to one set of DRX parameters, that is, each multicast service is configured with respective discontinuous reception DRX parameters. The DRX parameters include:

an on duration timer corresponding to the multicast service, for example, onDurationTimerMBS or drx-InactivityTimerMBS;

retransmission monitoring parameters corresponding to the multicast service, for example, drx-HARQ-RTT-TimerDL and drx-RetransmissionTimerDL;

a DRX cycle parameter of the multicast service, for example, schedulingPeriodStartOffsetMB S; and a start delay parameter of drx-onDurationTimer corresponding to the multicast service, for example, drx-SlotOffset.

The on duration timer (onDurationTimerMBS and drx-InactivityTimerMBS) corresponding to the multicast service is a parameter for determining an activation state corresponding to the multicast service. onDurationTimerMBS indicates duration in which the UE is in an active state in a DRX cycle. A unit of onDurationTimerMBS may be subms or ms, and a unit to be used may be indicated by the base station. Specifically, it may be understood that running time of either of onDurationTimerMBS and drx-InactivityTimerMBS during running is active time of the multicast service.

The retransmission monitoring parameters (drx-HARQ-RTT-TimerDL and drx-RetransmissionTimerDL) corresponding to the multicast service are used in combination for one HARQ process, and are used by the terminal device to determine when to monitor retransmission of the base station.

The DRX cycle parameter (schedulingPeriodStartOffsetMBS) of the multicast service may be for determining a DRX cycle and a start location of the DRX cycle.

The start delay parameter (drx-SlotOffset) of drx-onDurationTimer corresponding to the multicast service may be for determining a delay before drx-onDurationTimer is started.

If the terminal device configures a multicast-related DRX parameter, that is, DRX is configured for a multicast identifier, and the active time (Active time) includes the running time of either of onDurationTimerMBS and drx-InactivityTimerMBS, a MAC entity of the terminal device performs the following operations:

If a first condition is met, the terminal device starts onDurationTimerMBS.

In a possible design, if the first condition is that [(SFN×10)+subframe number] modulo (MBS-SchedulingCycle)=MBS-SchedulingOffset is met, onDurationTimerMBS is started after drx-SlotOffset from a start of a subframe that meets the condition, where the SFN is a system frame number system frame number, and the multicast scheduling cycle MBS-SchedulingCycle and the multicast scheduling offset MBS-SchedulingOffset are determined based on a higher layer configuration parameter, namely, the multicast scheduling cycle, and an offset parameter schedulingPeriodStartOffsetMB S.

The terminal device performs at least one of the following within the active time:

monitoring a PDCCH by using the first radio network temporary identifier.

If the PDCCH indicates one downlink transmission, the terminal device performs at least one of the following:

Option 1: Start or restart drx-InactivityTimerMBS.

Option 2: Stop onDurationTimerMBS and drx-InactivityTimerMBS, and start or restart drx-InactivityTimerMBS after drx-SlotOffset from a subframe including a PDSCH.

Option 3: Stop onDurationTimerMBS and drx-InactivityTimerMBS, and start or restart drx-InactivityTimerMBS at the first symbol after the PDCCH is received.

Optionally, the DRX configuration information may be carried in any one of the following: a system message, a radio resource control RRC message, a media access control control element MAC CE, or downlink control information DCI.

In a possible example, the first indication information is carried in any one of the following: a system message SIB, a radio resource control RRC message, a media access control control element MAC CE, or downlink control information DCI. Details may be as follows:

The first indication information may be carried in a SIB or an RRC message.

In a possible example, the first indication information may be indicated by using a bit or a field. In an indication manner using a bit, when the bit is set to "1", it indicates that PTP retransmission is enabled; or when the bit is set to "0", it indicates that PTP retransmission is disabled, or it indicates that PTP retransmission is not enabled. In an indication manner using a field, if the field is carried, it indicates that PTP retransmission is enabled; or if the field is not carried, it indicates that PTP retransmission is disabled/not enabled.

In a possible example, the first indication information may further include a plurality of multicast service identifiers and indication identifiers corresponding to a plurality of multicast services, and the UE learns, based on the received first indication information and the multicast service identifiers, one or more types of multicast services to which PTP retransmission is applicable.

A manner in which the first indication information sent by the base station includes the multicast service identifiers may be as follows:

(1) A PTP retransmission function is enabled for a multicast service identifier 1, a multicast service identifier 2, and the like, where the service identifier may be a temporary mobile group identity (TMGI, temporary mobile group identity) or a group radio network temporary identifier (G-RNTI, group radio network temporary identifier), and the service identifier corresponds to an enabling identifier.

(2) A bitmap (bitmap) manner is used for indication. A correspondence between each bit in a bitmap and a multicast service identifier is pre-specified. When a bit is set to 1, it indicates that a PTP retransmission function is enabled for a multicast service corresponding to the bit.

(3) A PTP retransmission function is enabled. If the first indication information carries an identifier of a multicast service, a PTP retransmission function is enabled for the multicast service.

Figure 2C:
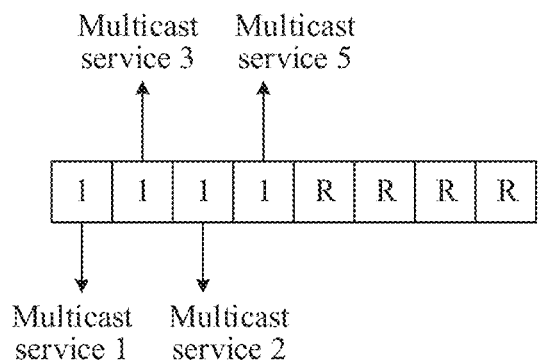
FIG. 2C is a possible bitmap of a multicast service identifier according to an embodiment of this application.

FIG. 2C shows a possible bitmap of a multicast service identifier. As shown in FIG. 2C, a quantity of bits corresponding to the bitmap and a quantity of multicast service identifiers are not limited in this application. A sequence of the multicast service identifiers from left to right may be the same as a sequence of configuring the multicast service identifiers by the base station. For example, when the base station configures parameters related to multicast services, a configuration sequence is a multicast service 1, a multicast service 3, a multicast service 2, a multicast service 5. Certainly, another sequence of the multicast service identifiers may alternatively be used. When a bit for an identifier corresponding to a multicast service is "1", a PTP retransmission function is enabled for the multicast service corresponding to the bit for the identifier; and when the bit for the identifier corresponding to the multicast service is "0", a PTP retransmission function is not enabled for the multicast service corresponding to the bit for the identifier. Certainly, alternatively, when a bit for an identifier corresponding to a multicast service is "0", a PTP retransmission function is enabled for the multicast service corresponding to the bit for the identifier; and when the bit for the identifier corresponding to the multicast service is "1", a PTP retransmission function is not enabled for the multicast service corresponding to the bit for the identifier. This is not specifically limited in this application.

The network device may further send second indication information to the terminal device, where the second indication information indicates the terminal device to use the DRX configuration information corresponding to the unicast service and/or the DRX configuration information corresponding to the multicast service. For example, the second indication information may indicate the terminal device to use the DRX configuration information corresponding to the unicast service, the second indication information may indicate the terminal device to use the DRX configuration information corresponding to the multicast service, or the second indication information indicates the terminal device to use the DRX configuration information corresponding to the unicast service and the DRX configuration information corresponding to the multicast service. The terminal device determines the discontinuous reception DRX configuration information based on the second indication information.

A method for sending the second indication information by the network device may be as follows:

The second indication information may be carried in any one of the following: RRC signaling, a MAC CE, or a DCI indication.

The second indication information may implement indication in an explicit manner or an implicit manner.

If the explicit manner is used, the base station may perform indication by using a bit. For details, refer to an indication manner of the first indication information.

If the implicit manner is used, the base station may implicitly carry information by using some parameters. For example, if the base station configures a group PUCCH, for multicast UE, the group PUCCH is shared, and the UE sends a NACK (NACK-only) on the group PUCCH. When the base station sends a feedback NACK on the group PUCCH, the base station cannot distinguish which UE sends the NACK. Correspondingly, the base station can perform retransmission only in a multicast manner. In other words, in this case, the base station may implicitly notify, by using a group PUCCH configuration, the UE of information that can be retransmitted only in the multicast manner.

Optionally, the network device may separately indicate DRX configuration information of different multicast services. Specifically, the terminal device uses the DRX configuration information corresponding to the unicast service and/or the DRX configuration information corresponding to the multicast service, that is, different multicast services may correspond to same or different DRX configuration information of the multicast services.

Figure 3:
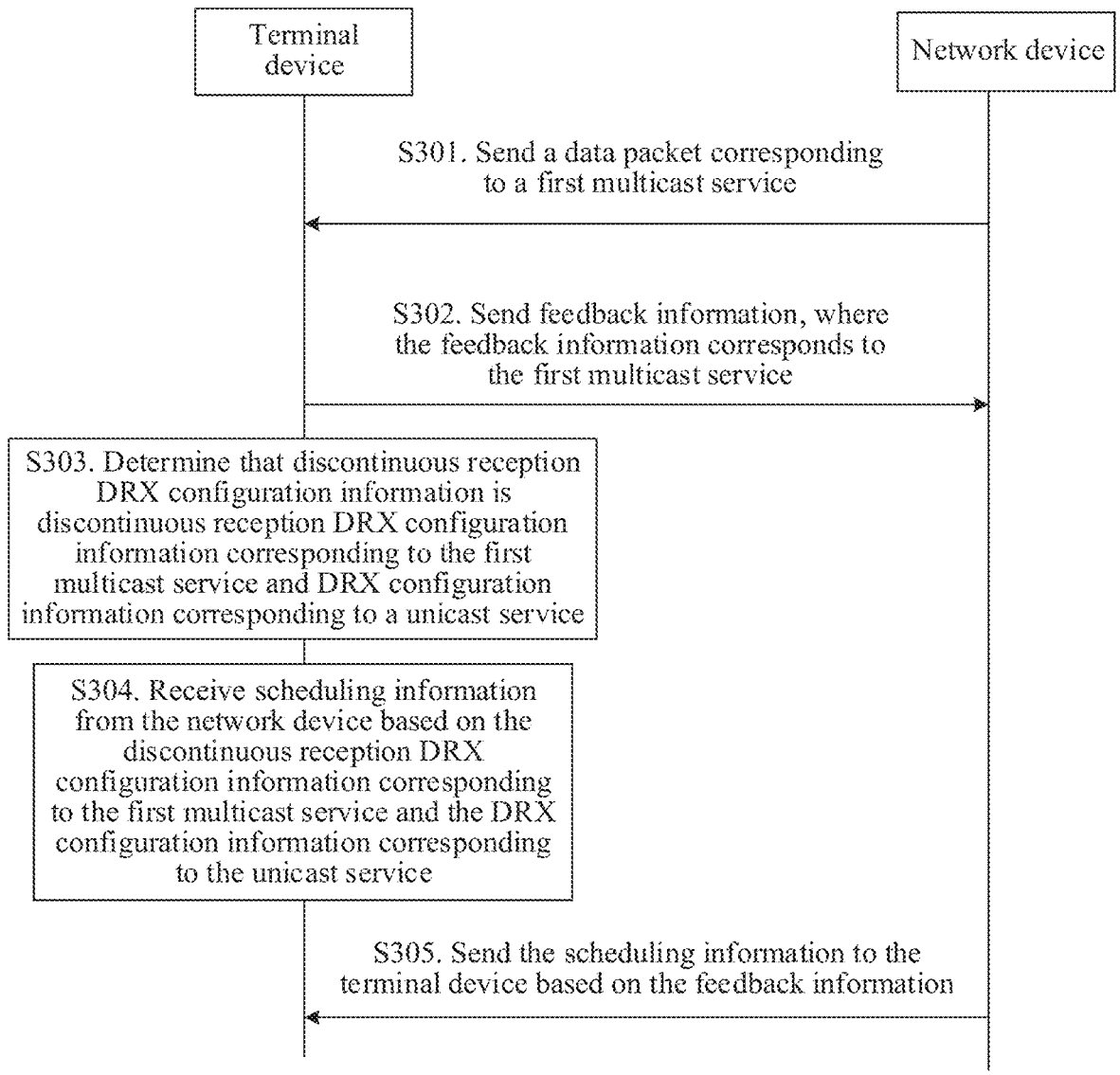
FIG. 3 is a schematic interaction diagram of another communication method according to an embodiment of this application.

FIG. 3 is a schematic interaction diagram of another communication method according to an embodiment of this application. As shown in FIG. 3, the method includes the following steps.

S301. A network device sends a data packet corresponding to a first multicast service to a terminal device.

The network device may send the data packet corresponding to the first multicast service in a unicast or multicast scheduling manner.

S302. The terminal device sends feedback information to the network device, where the feedback information corresponds to the first multicast service.

S303. The terminal device determines that discontinuous reception DRX configuration information is discontinuous reception DRX configuration information corresponding to the first multicast service and DRX configuration information corresponding to a unicast service.

S304. The terminal device receives scheduling information from the network device based on the discontinuous reception DRX configuration information corresponding to the first multicast service and the DRX configuration information corresponding to the unicast service.

S305. The network device sends the scheduling information to the terminal device based on the feedback information.

A method for receiving the scheduling information from the network device based on the discontinuous reception DRX configuration information corresponding to the first multicast service may be: starting a first HARQ RTT timer; if the first HARQ RTT timer expires, starting a first downlink DRX retransmission timer; and during running of the first downlink DRX retransmission timer, monitoring a PDCCH by using a first radio network temporary identifier RNTI corresponding to the first multicast service, and receiving the scheduling information from the network device.

A method for receiving the scheduling information from the network device based on the DRX configuration information corresponding to the unicast service may be: starting a second HARQ RTT timer; if the second HARQ RTT timer expires, starting a second downlink DRX retransmission timer; and during running of the second downlink DRX retransmission timer, monitoring a PDCCH by using a second RNTI corresponding to the unicast service, and receiving the scheduling information from the network device.

A start moment of the first HARQ RTT timer and a start moment of the second HARQ RTT timer may be the same, or may be different. If they are different, an interval between the start moment of the first HARQ RTT timer and the start moment of the second HARQ RTT timer may be a preset interval, and the preset interval is set based on an empirical value or historical data.

During running of the first downlink DRX retransmission timer, scheduling information from the network device is received, where the scheduling information may be scheduling information for retransmission of the first multicast service.

Certainly, when the first HARQ RTT timer is started, the scheduling information from the network device may alternatively be received during running period of the first HARQ RTT timer, where the scheduling information may be scheduling information for transmission of a new data packet.

The terminal device may further have scheduling information of different multicast services, and the scheduling information of the different multicast services does not affect each other.

The first HARQ RTT timer may be started at a first moment after an end of sending the feedback information to the network device, and/or the second HARQ RTT timer may be started at a second moment after an end of sending the feedback information to the network device.

The first downlink DRX retransmission timer may be started at a third moment after the first HARQ RTT timer expires, and/or the first downlink DRX retransmission timer may be started at a fourth moment after the second HARQ RTT timer expires.

The first moment is an $a^{th}$ symbol, the second moment is a $b^{th}$ symbol, the third moment is a $c^{th}$ symbol, and the fourth moment is a $d^{th}$ symbol, where a, b, c, and d are positive integers greater than or equal to 1. Certainly, the first moment and the second moment may be a same moment or may be different moments, and the third moment and the fourth moment may be a same moment or may be different moments.

Optionally, the first HARQ RTT timer or the second HARQ RTT timer may be started by using the following method: If the feedback information indicates that multicast service data is unsuccessfully received, the first HARQ RTT timer is started; or if the feedback information indicates that multicast service data is unsuccessfully received, the second HARQ RTT timer is started. Specifically, it may be understood as that, when the feedback information is a NACK, the NACK indicates that the data packet corresponding to the first multicast service is unsuccessfully received, and the first HARQ RTT timer or the second HARQ RTT timer is started.

In this example, according to a design, the terminal device receives the scheduling information from the network device by using the discontinuous reception DRX configuration information corresponding to the first multicast service and the DRX configuration information corresponding to the unicast service. This avoids uncertainty about configuration information used by the terminal device to receive the scheduling information, and improves accuracy of receiving the scheduling information by the terminal device.

Figure 4:
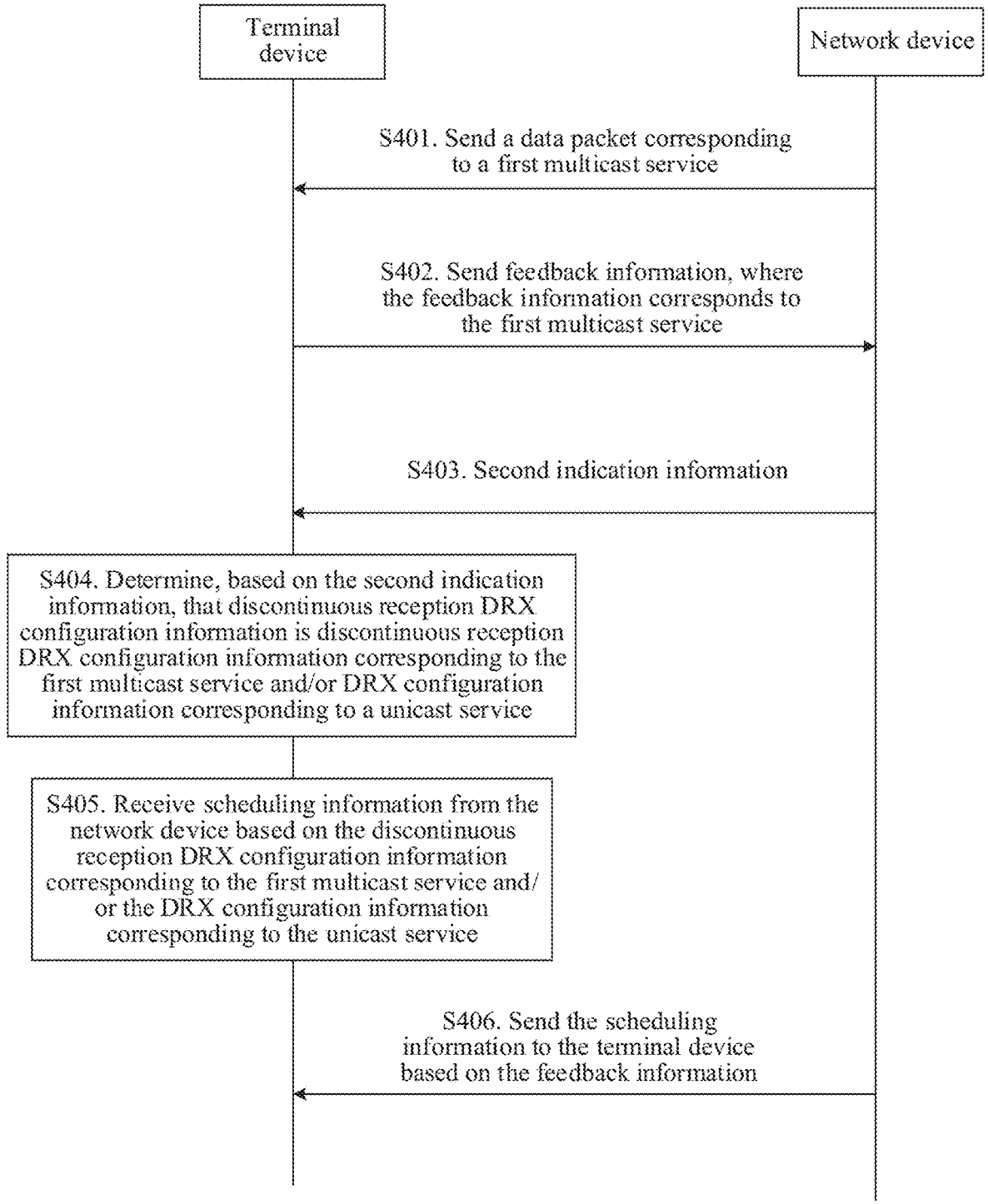
FIG. 4 is a schematic interaction diagram of another communication method according to an embodiment of this application.

In a possible implementation, FIG. 4 is a schematic interaction diagram of another communication method according to an embodiment of this application. As shown in FIG. 4, the method includes the following steps.

S401. A network device sends a data packet corresponding to a first multicast service to a terminal device.

The network device may send the data packet corresponding to the first multicast service in a unicast or multicast scheduling manner.

S402. The terminal device sends feedback information to the network device, where the feedback information corresponds to the first multicast service.

S403. The network device sends second indication information to the terminal device.

The second indication information indicates the terminal device to use DRX configuration information corresponding to a unicast service and/or DRX configuration information corresponding to the multicast service.

S404. The terminal device determines, based on the second indication information, that discontinuous reception DRX configuration information is the discontinuous reception DRX configuration information corresponding to the first multicast service and/or the DRX configuration information corresponding to the unicast service.

For example, the terminal device may determine, based on the second indication information, that the discontinuous reception DRX configuration information is the discontinuous reception DRX configuration information corresponding to the first multicast service. Alternatively, the terminal device may determine, based on the second indication information, that the discontinuous reception DRX configuration information is the DRX configuration information corresponding to the unicast service. Alternatively, the terminal device determines, based on the second indication, that the discontinuous reception DRX configuration information is the discontinuous reception DRX configuration information corresponding to the first multicast service and the DRX configuration information corresponding to the unicast service.

S405. The terminal device receives scheduling information from the network device based on the discontinuous reception DRX configuration information corresponding to the first multicast service and/or the DRX configuration information corresponding to the unicast service.

S406. The network device sends the scheduling information to the terminal device based on the feedback information.

For steps S401 and S402, refer to specific implementations of steps S201 and S202 in the foregoing embodiment. For steps S404 to S406, refer to specific implementations of steps S303 to S305 in the foregoing embodiment. Details are not described herein again. There is no execution sequence between step S403 and step S401. Specifically, step S403 may be performed before step S401, step S403 may be performed after step S401, or step S403 and step S401 may be simultaneously performed.

A first HARQ RTT timer is started; if the first HARQ RTT timer expires, a first downlink DRX retransmission timer is started; and during running of the first downlink DRX retransmission timer, a PDCCH is monitored by using a first radio network temporary identifier RNTI corresponding to the first multicast service, and the scheduling information from the network device is received.

For a specific method for receiving the scheduling information from the network device based on the discontinuous reception DRX configuration information corresponding to the first multicast service, refer to the method shown in step S304 in the foregoing embodiment.

In this example, according to a design, the terminal device receives the scheduling information from the network device by using the discontinuous reception DRX configuration information corresponding to the first multicast service. This avoids uncertainty about configuration information, in the discontinuous reception DRX configuration information corresponding to the first multicast service and the DRX configuration information corresponding to the unicast service, used by the terminal device to receive the scheduling information, and improves accuracy of receiving the scheduling information by the terminal device.

Figure 5:
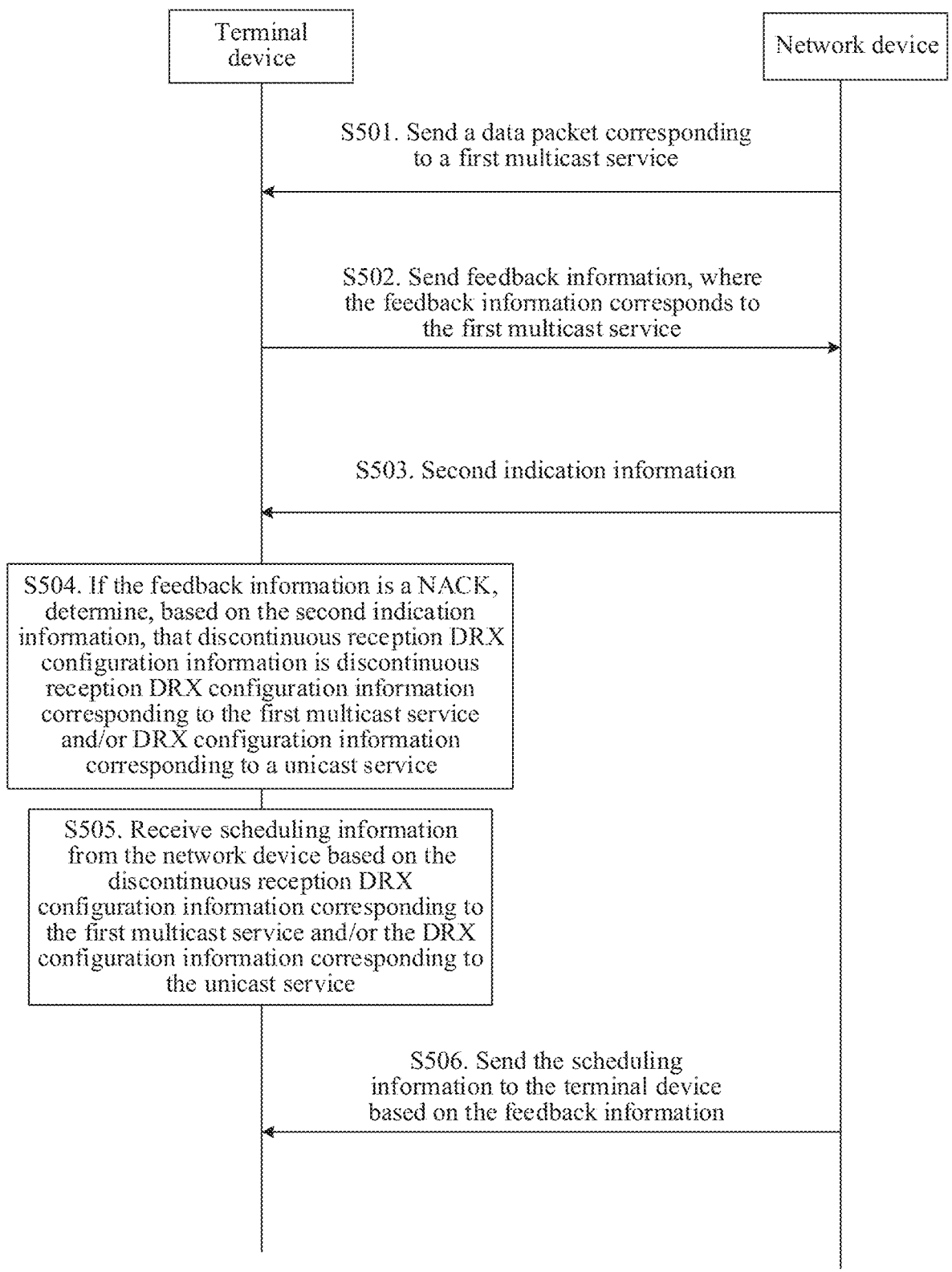
FIG. 5 is a schematic interaction diagram of another communication method according to an embodiment of this application.

In a possible implementation, FIG. 5 is a schematic interaction diagram of another communication method according to an embodiment of this application. As shown in FIG. 5, the method includes the following steps.

S501. A network device sends a data packet corresponding to a first multicast service to a terminal device.

The network device may send the data packet corresponding to the first multicast service in a unicast or multicast scheduling manner.

S502. The terminal device sends feedback information to the network device, where the feedback information corresponds to the first multicast service.

S503. The network device sends second indication information to the terminal device.

The second indication information indicates the terminal device to use DRX configuration information corresponding to a unicast service and/or DRX configuration information corresponding to the multicast service.

S504. If the feedback information is a NACK, the terminal device determines, based on the second indication, that discontinuous reception DRX configuration information is the discontinuous reception DRX configuration information corresponding to the first multicast service and/or the DRX configuration information corresponding to the unicast service.

For example, the terminal device may determine, based on the second indication information, that the discontinuous reception DRX configuration information is the discontinuous reception DRX configuration information corresponding to the first multicast service. Alternatively, the terminal device may determine, based on the second indication information, that the discontinuous reception DRX configuration information is the DRX configuration information corresponding to the unicast service. Alternatively, the terminal device determines, based on the second indication, that the discontinuous reception DRX configuration information is the discontinuous reception DRX configuration information corresponding to the first multicast service and the DRX configuration information corresponding to the unicast service.

S505. The terminal device receives scheduling information from the network device based on the discontinuous reception DRX configuration information corresponding to the first multicast service and/or the DRX configuration information corresponding to the unicast service.

S506. The network device sends the scheduling information to the terminal device based on the feedback information.

For steps S501 and S502, refer to specific implementations of steps S201 and S202 in the foregoing embodiment. For steps S504 to S506, refer to specific implementations of steps S303 to S305 in the foregoing embodiment. Details are not described herein again.

In this example, when the feedback information is a NACK, the terminal device determines, based on the second indication, that the discontinuous reception DRX configuration information is the discontinuous reception DRX configuration information corresponding to the first multicast service and/or the DRX configuration information corresponding to the unicast service, and receives the scheduling information from the network device based on the discontinuous reception DRX configuration information corresponding to the first multicast service and/or the DRX configuration information corresponding to the unicast service. This avoids uncertainty about configuration information, in the discontinuous reception DRX configuration information corresponding to the first multicast service and the DRX configuration information corresponding to the unicast service, used by the terminal device to receive the scheduling information, and improves accuracy of receiving the scheduling information by the terminal device. In addition, the terminal device monitors a PDCCH based on the second indication information only when the NACK is received, to receive the scheduling information from the network device. This reduces power consumption of the terminal device.

Figure 6:
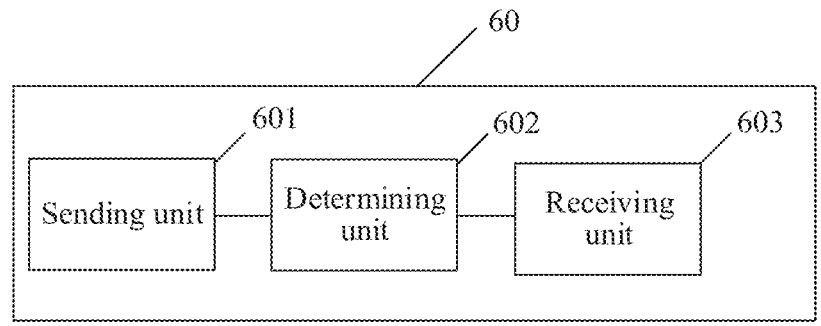
FIG. 6 is a schematic diagram of a structure of a terminal device according to an embodiment of this application.

FIG. 6 is a schematic diagram of a structure of a terminal device according to an embodiment of this application. As shown in FIG. 6, the terminal device 60 includes:

a sending unit 601, configured to send feedback information to a network device, where the feedback information corresponds to a first multicast service;

a determining unit 602, configured to determine discontinuous reception DRX configuration information, where the DRX configuration information includes at least one of discontinuous reception DRX configuration information corresponding to the first multicast service and DRX configuration information corresponding to a unicast service; and a receiving unit 603, configured to receive scheduling information from the network device based on the DRX configuration information.

In a possible implementation, the DRX configuration information corresponding to the first multicast service includes duration of a first downlink hybrid automatic repeat request round trip time timer HARQ RTT timer and duration of a first downlink DRX retransmission timer.

In a possible implementation, the DRX configuration information corresponding to the unicast service includes duration of a second downlink hybrid automatic repeat request round trip time timer HARQ RTT timer and duration of a second downlink DRX retransmission timer.

In a possible implementation, the DRX configuration information includes the discontinuous reception DRX configuration information corresponding to the first multicast service and the DRX configuration information corresponding to the unicast service, and the receiving unit 603 is configured to:
  start the first HARQ RTT timer; if the first HARQ RTT timer expires, start the first downlink DRX retransmission timer; and during running of the first downlink DRX retransmission timer, monitor a PDCCH by using a first radio network temporary identifier RNTI corresponding to the first multicast service, and receive scheduling information from the network device; and
  start the second HARQ RTT timer; if the second HARQ RTT timer expires, start the second downlink DRX retransmission timer; and during running of the second downlink DRX retransmission timer, monitor a PDCCH by using a second RNTI corresponding to the unicast service, and receive scheduling information from the network device.

In a possible implementation, the DRX configuration information includes the discontinuous reception DRX configuration information corresponding to the first multicast service, and the receiving unit 603 is configured to:
  start the first HARQ RTT timer; if the first HARQ RTT timer expires, start the first downlink DRX retransmission timer; and during running of the first retransmission timer, monitor a PDCCH by using a first RNTI and a second RNTI, and receive the scheduling information from the network device.

In a possible implementation, the DRX configuration information includes the DRX configuration information corresponding to the unicast service, and the receiving unit 603 is configured to:
  start the second HARQ RTT timer; if the second HARQ RTT timer expires, start the second downlink DRX retransmission timer; and during running of the second retransmission timer, monitor a PDCCH by using a first RNTI and a second RNTI, and receive the scheduling information from the network device.

With reference to the third aspect, in a possible implementation, in case of starting the first HARQ RTT timer and/or starting the second HARQ RTT timer, the receiving unit 603 is specifically configured to:
  start the first HARQ RTT timer at a first moment after an end of sending the feedback information to the network device; and/or
  start the second HARQ RTT timer at a second moment after an end of sending the feedback information to the network device.

In a possible implementation, the receiving unit 603 is further configured to:
  start the first downlink DRX retransmission timer at a third moment after the first HARQ RTT timer expires; and/or
  start the first downlink DRX retransmission timer at a fourth moment after the second HARQ RTT timer expires.

In a possible implementation, the first moment is an $a^{th}$ symbol, the second moment is a $b^{th}$ symbol, the third moment is a $c^{th}$ symbol, and the fourth moment is a $d^{th}$ symbol, where a, b, c, and d are positive integers greater than or equal to 1.

With reference to the third aspect, in a possible implementation, the receiving unit 603 is further configured to:
  start the first HARQ RTT timer if the feedback information indicates that multicast service data is unsuccessfully received; or
  start the second HARQ RTT timer if the feedback information indicates that multicast service data is unsuccessfully received.

In a possible implementation, the device is further configured to:
  obtaining first indication information, where the first indication information indicates that the network device supports retransmission of the multicast service in a unicast manner.

In a possible implementation, the first indication information is carried in any one of the following: a system message, a radio resource control RRC message, a media access control control element MAC CE, or downlink control information DCI.

In a possible implementation, the determining unit 602 is configured to:
  receive second indication information, where the second indication information indicates the terminal device to use the DRX configuration information corresponding to the unicast service and/or the DRX configuration information corresponding to the multicast service; and
  determine the discontinuous reception DRX configuration information based on the second indication information.

In a possible implementation, the scheduling information of the network device includes scheduling information for retransmission of the first multicast service and/or scheduling information for transmission of a new data packet, where
  the new data packet includes a data packet of a second multicast service or a data packet corresponding to the unicast service.

In this embodiment, the terminal device 60 is presented in a form of units. The "unit" herein may be an application-specific integrated circuit (application-specific integrated circuit, ASIC), a processor and a memory that execute one or more software or firmware programs, an integrated logic circuit, and/or another device that can provide the foregoing functions. In addition, the determining unit 601 may be implemented by using a processor 701 of a terminal device shown in FIG. 7.

Figure 7:
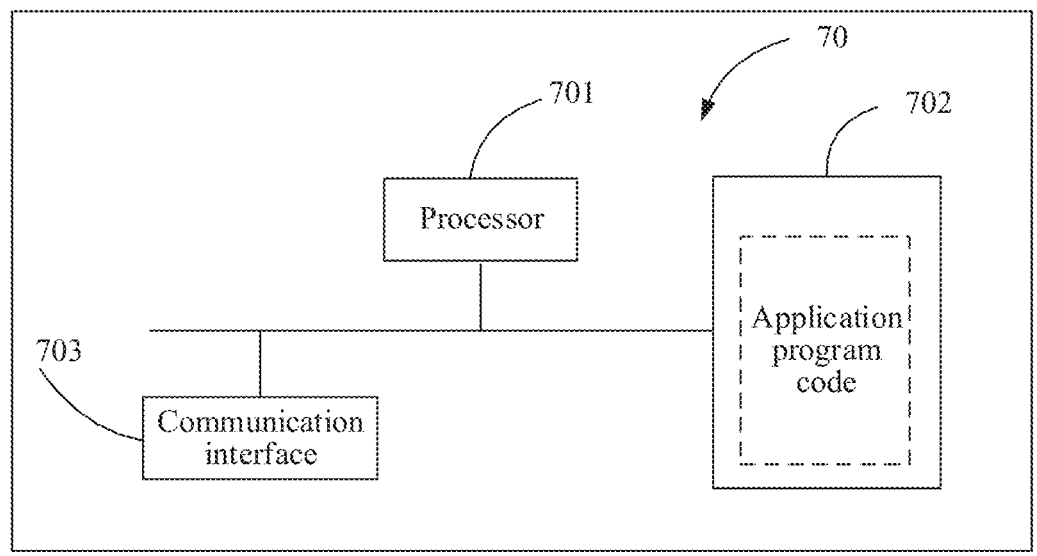
FIG. 7 is a schematic diagram of a structure of another terminal device according to an embodiment of this application.

As shown in FIG. 7, a terminal device 70 may be implemented by using a structure in FIG. 6. The terminal device 70 includes at least one processor 701, at least one memory 702, and at least one communication interface 703. The processor 701, the memory 702, and the communication interface 703 are connected and communicate with each other through a communication bus.

The processor 701 may be a general-purpose central processing unit (CPU), a microprocessor, an application-specific integrated circuit (application-specific integrated circuit, ASIC), or one or more integrated circuits configured to control program execution of the foregoing solution.

The communication interface 703 is configured to communicate with another device or a communication network such as the Ethernet, a radio access network (RAN), or a wireless local area network (Wireless Local Area Network, WLAN).

The memory 702 may be a read-only memory (read-only memory, ROM) or another type of static storage device that can store static information and instructions, or a random access memory (random access memory, RAM) or another type of dynamic storage device that can store information and instructions; or may be an electrically erasable programmable read-only memory (Electrically Erasable Programmable Read-Only Memory, EEPROM), a compact disc read-only memory (Compact Disc Read-Only Memory, CD-ROM) or another compact disc storage, an optical disc storage (including a compact disc, a laser disc, an optical disc, a digital versatile disc, a Blu-ray disc, or the like), a magnetic disk storage medium, another magnetic storage device, or any other medium that can be configured to carry or store expected program code in a form of instructions or a data structure and that can be accessed by a computer. However, this is not limited thereto. The memory may exist independently, and is connected to the processor through the bus. The memory may alternatively be integrated with the processor.

The memory 702 is configured to store application program code for executing the foregoing solution, and the processor 701 controls the execution. The processor 701 is configured to execute the application program code stored in the memory 702.

The code stored in the memory 702 may be for performing the communication method provided above: sending feedback information to a network device, where the feedback information corresponds to a first multicast service; determining discontinuous reception DRX configuration information, where the DRX configuration information includes at least one of discontinuous reception DRX configuration information corresponding to the first multicast service and DRX configuration information corresponding to a unicast service; and receiving scheduling information from the network device based on the DRX configuration information.

Figure 8:
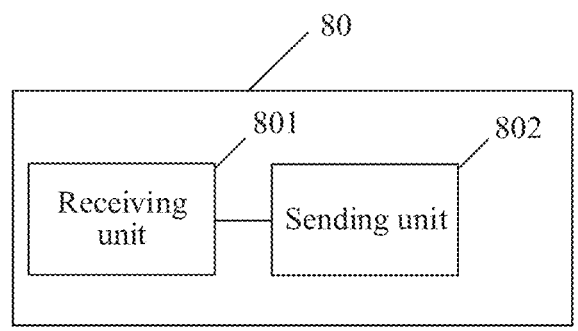
FIG. 8 is a schematic diagram of a structure of a network device according to an embodiment of this application.

FIG. 8 is a schematic diagram of a structure of a network device according to an embodiment of this application. As shown in FIG. 8, the network device 80 includes:
- a receiving unit 801, configured to receive feedback information sent by a terminal device, where the feedback information corresponds to a first multicast service; and
- a sending unit 802, configured to send scheduling information to the terminal device based on the feedback information.

In a possible implementation, the device is configured to:
send first indication information, where the first indication information indicates that the network device supports retransmission of the multicast service in a unicast manner.

In a possible implementation, the first indication information is carried in any one of the following: a system message, a radio resource control RRC message, a media access control control element MAC CE, or downlink control information DCI.

In a possible implementation, the device is further configured to:
send second indication information, where the second indication information indicates the terminal device to use DRX configuration information corresponding to a unicast service and/or DRX configuration information corresponding to the multicast service.

In a possible implementation, the DRX configuration information corresponding to the first multicast service includes duration of a first downlink hybrid automatic repeat request round trip time timer HARQ RTT timer and duration of a first downlink DRX retransmission timer.

In a possible implementation, the DRX configuration information corresponding to the unicast service includes duration of a second downlink hybrid automatic repeat request round trip time timer HARQ RTT timer and duration of a second downlink DRX retransmission timer.

In a possible implementation, the scheduling information includes scheduling information for retransmission of the first multicast service and/or scheduling information for transmission of a new data packet, where
the new data packet includes a data packet of a second multicast service or a data packet corresponding to the unicast service.

In this embodiment, the network device 80 is presented in a form of units. The "unit" herein may be an application-specific integrated circuit (application-specific integrated circuit, ASIC), a processor and a memory that execute one or more software or firmware programs, an integrated logic circuit, and/or another device that can provide the foregoing functions. In addition, the sending unit 802 may be implemented by using a processor 901 of a network device shown in FIG. 9.

Figure 9:
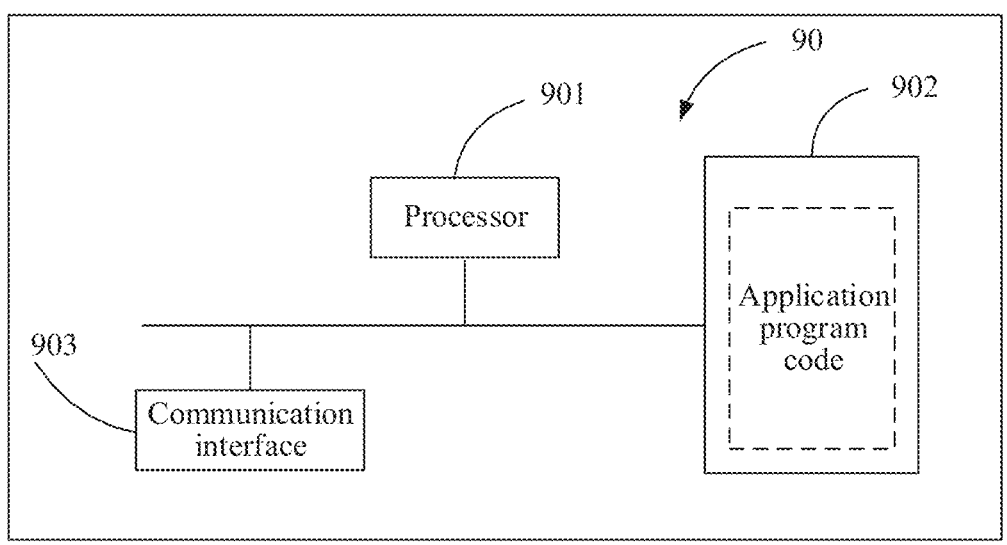
FIG. 9 is a schematic diagram of a structure of another network device according to an embodiment of this application.

As shown in FIG. 9, a network device 90 may be implemented in a structure in FIG. 8. The network device 90 includes at least one processor 901, at least one memory 902, and at least one communication interface 903. The processor 901, the memory 902, and the communication interface 903 are connected and communicate with each other through a communication bus.

The processor 901 may be a general-purpose central processing unit (CPU), a microprocessor, an application-specific integrated circuit (application-specific integrated circuit, ASIC), or one or more integrated circuits configured to control program execution of the foregoing solution.

The communication interface 903 is configured to communicate with another device or a communication network such as the Ethernet, a radio access network (RAN), or a wireless local area network (Wireless Local Area Network, WLAN).

The memory 902 may be a read-only memory (read-only memory, ROM) or another type of static storage device that can store static information and instructions, or a random access memory (random access memory, RAM) or another type of dynamic storage device that can store information and instructions, or may be an electrically erasable programmable read-only memory (Electrically Erasable Programmable Read-Only Memory, EEPROM), a compact disc read-only memory (Compact Disc Read-Only Memory, CD-ROM) or another compact disc storage, an optical disc storage (including a compact disc, a laser disc, an optical disc, a digital versatile disc, a Blu-ray disc, or the like), a magnetic disk storage medium, another magnetic storage device, or any other medium that can be configured to carry or store expected program code in a form of instructions or a data structure and that can be accessed by a computer. However, this is not limited thereto. The memory may exist independently, and is connected to the processor through the bus. The memory may alternatively be integrated with the processor.

The memory 902 is configured to store application program code for executing the foregoing solution, and the processor 901 controls the execution. The processor 901 is configured to execute the application program code stored in the memory 902.

The code stored in the memory 902 may be for performing the communication method provided above: receiving feedback information sent by a terminal device, where the feedback information corresponds to a first multicast service; and sending scheduling information to the terminal device based on the feedback information.

An embodiment of the present invention further provides a computer storage medium. The computer storage medium may store a program, and when the program is executed, some or all of the steps of any communication method described in the foregoing method embodiment are performed.

It should be noted that, to make the description brief, the foregoing method embodiments are expressed as a series of actions. However, a person skilled in the art should appreciate that the present invention is not limited to the described action sequence, because according to the present invention, some steps may be performed in other sequences or performed simultaneously. In addition, a person skilled in the art should also appreciate that all embodiments described in the specification are example embodiments, and the related actions and modules are not necessarily mandatory to the present invention.

In the foregoing embodiments, the description of each embodiment has respective focuses. For a part that is not described in detail in an embodiment, refer to related descriptions in other embodiments.

In the several embodiments provided in this application, it should be understood that the disclosed apparatus may be implemented in other manners. For example, the described apparatus embodiments are merely examples. For example, division into the units is merely logical function division, and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage. Based on such an understanding, the technical solutions of the present invention essentially, or the part contributing to the conventional technology, or all or some of the technical solutions may be implemented in a form of a software product. The computer software product is stored in a memory and includes several instructions for instructing a computer device (which may be a personal computer, a server, a network device, or the like) to perform all or some of the steps of the methods described in embodiments of the present invention. The foregoing storage medium includes any medium that can store program code, such as a USB flash drive, a read-only memory (ROM, Read-Only Memory), a random access memory (RAM, Random Access Memory), a removable hard disk, a magnetic disk, or an optical disc.

A person of ordinary skill in the art may understand that all or some of the steps of the methods in embodiments may be implemented by a program instructing related hardware. The program may be stored in a computer-readable memory. The memory may include a flash memory, a read-only memory (English: Read-Only Memory, ROM for short), a random access memory (English: Random Access Memory, RAM for short), a magnetic disk, an optical disc, or the like.

Embodiments of the present invention are described in detail above. The principle and implementation of the present invention are described herein through specific examples. The description about embodiments of the present invention is merely provided to help understand the method and core ideas of the present invention. In addition, a person of ordinary skill in the art can make variations and modifications to the present invention in terms of the specific implementations and application scopes according to the ideas of the present invention. Therefore, the content of specification shall not be construed as a limit to the present invention.

What is claimed is:

1. A communication method, wherein the method is applied to a terminal device, and the method comprises:
    sending feedback information of a first data packet of a first multicast service, wherein downlink control information (DCI) for scheduling the first data packet is scrambled by group radio network temporary identifier (G-RNTI);
    receiving a second information, wherein the second information comprises a discontinuous reception (DRX) configuration information corresponding to a first unicast service, the DRX configuration information corresponding to the first unicast service comprises duration of a second downlink hybrid automatic repeat request round trip time timer (HARQ RTT) timer and duration of a second downlink DRX retransmission timer, and a data packet of the first unicast service is scrambled by cell radio network temporary identifier (C-RNTI);
    starting the second downlink HARQ RTT timer at a first moment after an end of sending the feedback information; and
    monitoring, based on DRX configuration information, a Physical Downlink Control Channel (PDCCH) for scheduling information of a data packet of the first multicast service, wherein the scheduling information is scrambled by the C-RNTI.

2. The method according to claim 1, wherein the method further comprises:
    after the second downlink HARQ RTT timer expires, starting the second downlink DRX retransmission timer; and wherein the scheduling information is monitored during running of the second downlink DRX retransmission timer.

3. The method according to claim 1, wherein the first moment is a first symbol after an end of sending the feedback information.

4. The method according to claim 1, wherein the method further comprises:
    obtaining a first indication information, the first indication information indicates that a network device supports retransmission of the first multicast service in a unicast manner.

5. The method according to claim 4, wherein the first indication information is carried in one of the following: a system message, a radio resource control (RRC) message, a media access control control element (MAC CE), or DCI.

6. The method according to claim 1, wherein the feedback information is an Acknowledgment (ACK) or a Negative Acknowledge (NACK), where the ACK indicates that the data packet corresponding to the first multicast service is successfully received, and the NACK indicates that the data packet corresponding to the first multicast service is unsuccessfully received.

7. The method according to claim 1, wherein the second information comprises a DRX configuration information corresponding to a first multicast service, the DRX configuration information corresponding to the first multicast service comprises duration of a first downlink HARQ RTT timer and duration of a first downlink DRX retransmission timer.

8. The method according to claim 7, wherein the method further comprises:
starting the first downlink HARQ RTT timer, after the first downlink HARQ RTT timer expires, starting the first downlink DRX retransmission timer; and during running of the first downlink DRX retransmission timer, monitoring a PDCCH for scheduling information that is scrambled by the G-RNTI.

9. The method according to claim 8, wherein the first downlink HARQ RTT timer is started at a first symbol after an end of sending the feedback information.

10. The method according to claim 1, wherein the data packet of the first multicast service comprises at least one of the following:
a retransmission of the first data packet of the first multicast service or a new data packet of the first multicast service.

11. A communication apparatus, comprising one or more processors; and a memory, wherein the memory stores a computer program, and when executing the computer program stored in the memory, the one or more processors execute operations comprising:
sending feedback information of a first data packet of a first multicast service, wherein downlink control information (DCI) for scheduling the first data packet is scrambled by group radio network temporary identifier (G-RNTI);
receiving a second information, wherein the second information comprises a discontinuous reception (DRX) configuration information corresponding to a first unicast service, the DRX configuration information corresponding to the first unicast service comprises duration of a second downlink hybrid automatic repeat request round trip time timer (HARQ RTT) timer and duration of a second downlink DRX retransmission timer, and a data packet of the first unicast service is scrambled by cell radio network temporary identifier (C-RNTI);
starting the second downlink HARQ RTT timer at a first moment after an end of sending the feedback information; and
monitoring, based on DRX configuration information, a Physical Downlink Control Channel (PDCCH) for scheduling information of a data packet of the first multicast service, wherein the scheduling information is scrambled by the C-RNTI.

12. The apparatus according to claim 11, wherein the operations further comprise:
after the second downlink HARQ RTT timer expires, starting the second downlink DRX retransmission timer; and wherein the scheduling information is monitored during running of the second downlink DRX retransmission timer.

13. The apparatus according to claim 11, wherein the first moment is a first symbol after an end of sending the feedback information.

14. The apparatus according to claim 11, wherein the operations further comprise:
obtaining a first indication information, the first indication information indicates that a network device supports retransmission of the first multicast service in a unicast manner.

15. The apparatus according to claim 14, wherein the first indication information is carried in one of the following: a system message, a radio resource control RRC message, a media access control control element MAC CE, or downlink control information DCI.

16. The apparatus according to claim 11, wherein the feedback information is an Acknowledgment (ACK) or a Negative Acknowledge (NACK), where the ACK indicates that the data packet corresponding to the first multicast service is successfully received, and the NACK indicates that the data packet corresponding to the first multicast service is unsuccessfully received.

17. The apparatus according to claim 11, wherein the second information comprises a DRX configuration information corresponding to a first multicast service, the DRX configuration information corresponding to the first multicast service comprises duration of a first downlink HARQ RTT timer and duration of a first downlink DRX retransmission timer.

18. The apparatus according to claim 17, wherein the operations further comprise:
starting the first downlink HARQ RTT timer, after the first downlink HARQ RTT timer expires, starting the first downlink DRX retransmission timer; and during running of the first downlink DRX retransmission timer, monitoring a PDCCH for scheduling information that is scrambled by the G-RNTI.

19. The apparatus according to claim 18, wherein the first downlink HARQ RTT timer is started at a first symbol after an end of sending the feedback information of the first data packet of the first multicast service.

20. One or more non-transitory computer-readable media storing computer instructions, that when executed by one or more processors, cause a computing device to perform operations comprising:
sending feedback information of a first data packet of a first multicast service, wherein downlink control information (DCI) for scheduling the first data packet is scrambled by group radio network temporary identifier (G-RNTI);
receiving a second information, wherein the second information comprises a discontinuous reception (DRX) configuration information corresponding to a first unicast service, the DRX configuration information corresponding to the first unicast service comprises duration of a second downlink hybrid automatic repeat request round trip time timer (HARQ RTT) timer and duration of a second downlink DRX retransmission timer, and a data packet of the first unicast service is scrambled by cell radio network temporary identifier (C-RNTI);
starting the second downlink HARQ RTT timer at a first moment after an end of sending the feedback information; and
monitoring, based on DRX configuration information, a Physical Downlink Control Channel (PDCCH) for scheduling information of a data packet of the first multicast service, wherein the scheduling information is scrambled by the C-RNTI.

* * * * *